United States Patent
Pong et al.

(10) Patent No.: US 6,516,343 B1
(45) Date of Patent: Feb. 4, 2003

(54) COMPUTER SYSTEM AND METHOD FOR ENHANCING MEMORY-TO-MEMORY COPY TRANSACTIONS BY UTILIZING MULTIPLE SYSTEM CONTROL UNITS

(76) Inventors: Fong Pong, 150 Bryant Ave., Mountain View, CA (US) 94040; Tung Nguyen, 22346 Mc Clellan Rd., Cupertino, CA (US) 95014

( * ) Notice: Subject to any disclaimer, the term of this patent is extended or adjusted under 35 U.S.C. 154(b) by 0 days.

(21) Appl. No.: 09/557,380

(22) Filed: Apr. 24, 2000

(51) Int. Cl.[7] ............................................. G06F 13/00
(52) U.S. Cl. ................ 709/216; 709/217; 709/212; 709/219; 709/238; 711/124; 711/148
(58) Field of Search ................ 711/165, 147, 711/119, 124, 121, 130, 135, 146, 148; 709/212, 216, 217, 219, 213, 231, 232, 238; 710/3, 31, 36, 38, 316

(56) References Cited

U.S. PATENT DOCUMENTS

| | | | | |
|---|---|---|---|---|
| 4,845,609 A | * | 7/1989 | Lighthart et al. | 709/200 |
| 4,888,726 A | * | 12/1989 | Struger et al. | 709/201 |
| 5,287,453 A | * | 2/1994 | Roberts | 707/200 |
| 5,572,703 A | * | 11/1996 | MacWilliams et al. | 711/146 |
| 5,829,052 A | * | 10/1998 | Pawlowski et al. | 711/147 |
| 5,860,026 A | * | 1/1999 | Kitta et al. | 710/33 |
| 6,151,663 A | * | 11/2000 | Pawlowski et al. | 711/147 |

* cited by examiner

Primary Examiner—B. James Peikari (57) ABSTRACT

A computer system and method for enhancing memory-to-memory copy operations includes transmitting from the processor to the source system control unit a plurality of memory-to-memory copy transactions where each transaction includes a source address and a destination address. A lookup operation is performed on the destination address to determine the destination system control unit that controls access to the destination memory which contains the destination address. A number of data blocks located at the source address in the source memory are retrieved and transmitted to the destination address. The number of data blocks are stored at the destination address in the destination memory.

16 Claims, 6 Drawing Sheets

COMPUTER SYSTEM AND METHOD FOR ENHANCING MEMORY-TO-MEMORY COPY TRANSACTIONS BY UTILIZING MULTIPLE SYSTEM CONTROL UNITS

BACKGROUND OF THE INVENTION

1. Field of Invention

The present invention relates to the field of computer systems. More particularly, this invention relates to a system and method for enhancing memory to memory copies in computer systems.

2. Description of Related Art

A computer system typically includes a processor and a memory having a main memory and a cache memory for storing data and instructions for the processor. The cache memories store blocks of data and/or instructions that are received from the main memory. Typically, instructions from the main memory that are used by the processor are stored in the instruction cache and the data for that particular instruction is stored in the data cache. The computer system utilizes the processor to complete these instructions by executing commands that are part of these instructions.

One instruction that is frequently executed by the processor is a memory-to-memory copy. The memory-to-memory copy involves copying a data block from a first location in memory to a second location in memory. When a block copy is requested, the processor allocates address space in the second location for the data block, reads the data from the first location, and writes the data to the second location.

The copying of memory through the execution of instructions in the processor consumes processor time that could otherwise be used to execute other instructions. For example, when a number of memory requests are made, the processor is busy executing these requests for a significant amount of time. This reduces the amount of instructions that a particular processor can execute in a given time period.

It should therefore be appreciated that there remains a need for a computer system that can perform memory-to-memory copies without using a significant amount of the processor's resources. The present invention fulfills this need.

SUMMARY OF THE INVENTION

The present invention is embodied in a computer system, and related method, that includes system control units that enhance memory to memory copy transactions. The computer system includes a processor, a source system control unit coupled to the processor, a destination system control unit coupled to the source system control unit, a source memory coupled to the source system control unit, and a destination memory coupled to the destination system control unit.

The related method includes transmitting from the processor to the source system control unit a plurality of memory-to-memory copy transactions where each transaction includes a source address and a destination address. A lookup operation is performed on the destination address to determine the destination system control unit that controls access to the destination memory which contains the destination address. A number of data blocks located at the source address in the source memory are retrieved and transmitted to the destination address. The number of data blocks are stored at the destination address in the destination memory.

Other features and advantages of the present invention will be apparent from the detailed description that follows.

DESCRIPTION OF THE PREFERRED EMBODIMENT

Figure 1:
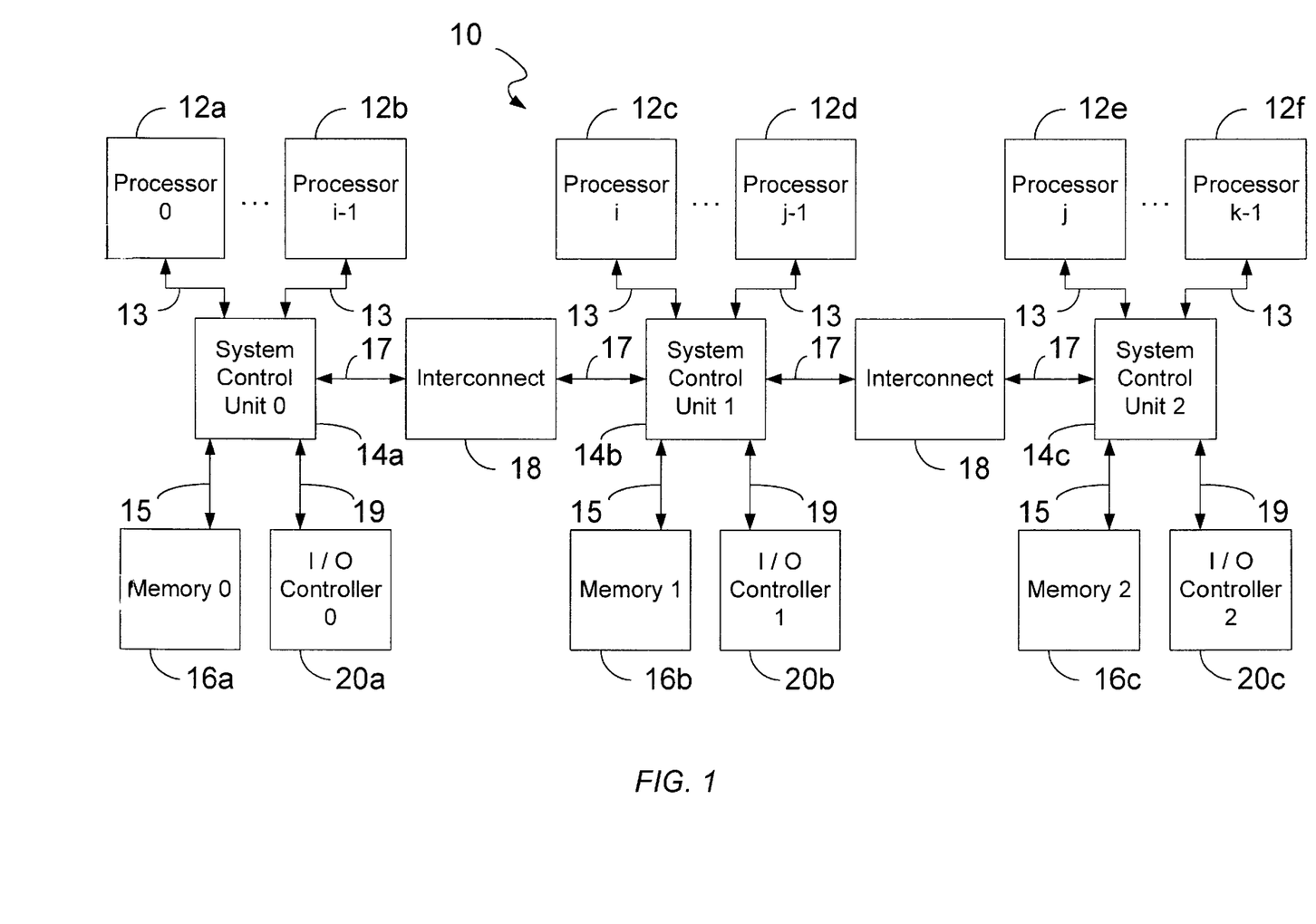
FIG. 1 is a block diagram of a computer system that processes multiple memory copies using system control units.

With reference now to the illustrative drawings, and particularly to FIG. 1, there is shown a block diagram of a computer system 10 that enhances the processing of multiple memory copies using system control units. The computer system of FIG. 1 is shown in simplified form where only three system control units are depicted. Typically, more than three system control units are connected to one another via interconnect 18 in the manner shown in FIG. 1. For example, the computer system may include a hundred system control units along with the corresponding hardware as partially shown in FIG. 1. In addition, a number of processors (0 through i–1, i through j–1, and j through k–1, where i,j, and k are positive integers) can be connected to each system control unit, respectively. One of ordinary skill in the art will be able to determine the number of processors and system control units to implement for a specific application that will optimize the processing speed and efficiency of the computer system.

The computer system, as shown in FIG. 1, has processors 12a, 12b, 12c, 12d, 12e, 12f, system control units 14a, 14b, 14c, memories 16a, 16b, 16c, interconnect 18, and input/output (I/O) controllers 20a, 20b, 20c. The processors are connected to the system control unit either via a common bus 13 or independent point-to-point interfaces. Each system control unit 14a may be connected to a memory 16a, an I/O controller 20a, and system control unit 14b via interconnect 18.

The processor 12e issues transactions to the system control unit 14c, generally referred to as the requesting node or requesting system control unit 14c. Alternatively, the transactions can be received from an I/O device (not shown) coupled to the I/O controller 20c. The transactions include commands such as memory-to-memory copies along with the amount of data to be copies, e.g., the number of cache lines to be copied, the source address identifying the location of the data to be retrieved from the source memory 16b, and the destination address identifying the location of the data to be stored to the destination memory 16a. Each system control unit maintains a system memory map containing its local memory map and remote memory maps corresponding to other system control units. The system memory maps contain address information indicating the addresses that are controlled by each system control unit and allow the requesting system control unit 14c or the source system control unit 14b to determine which system control unit controls the destination address.

The requesting system control unit 14c performs a lookup operation on its system map to determine the system control units that control the source address and the destination address. Once the system control units have been identified, the requesting system control unit 14c establishes communication with destination system control unit 14a. The requesting system control unit may also establish communication with the source system control unit 14b.

Figure 2:
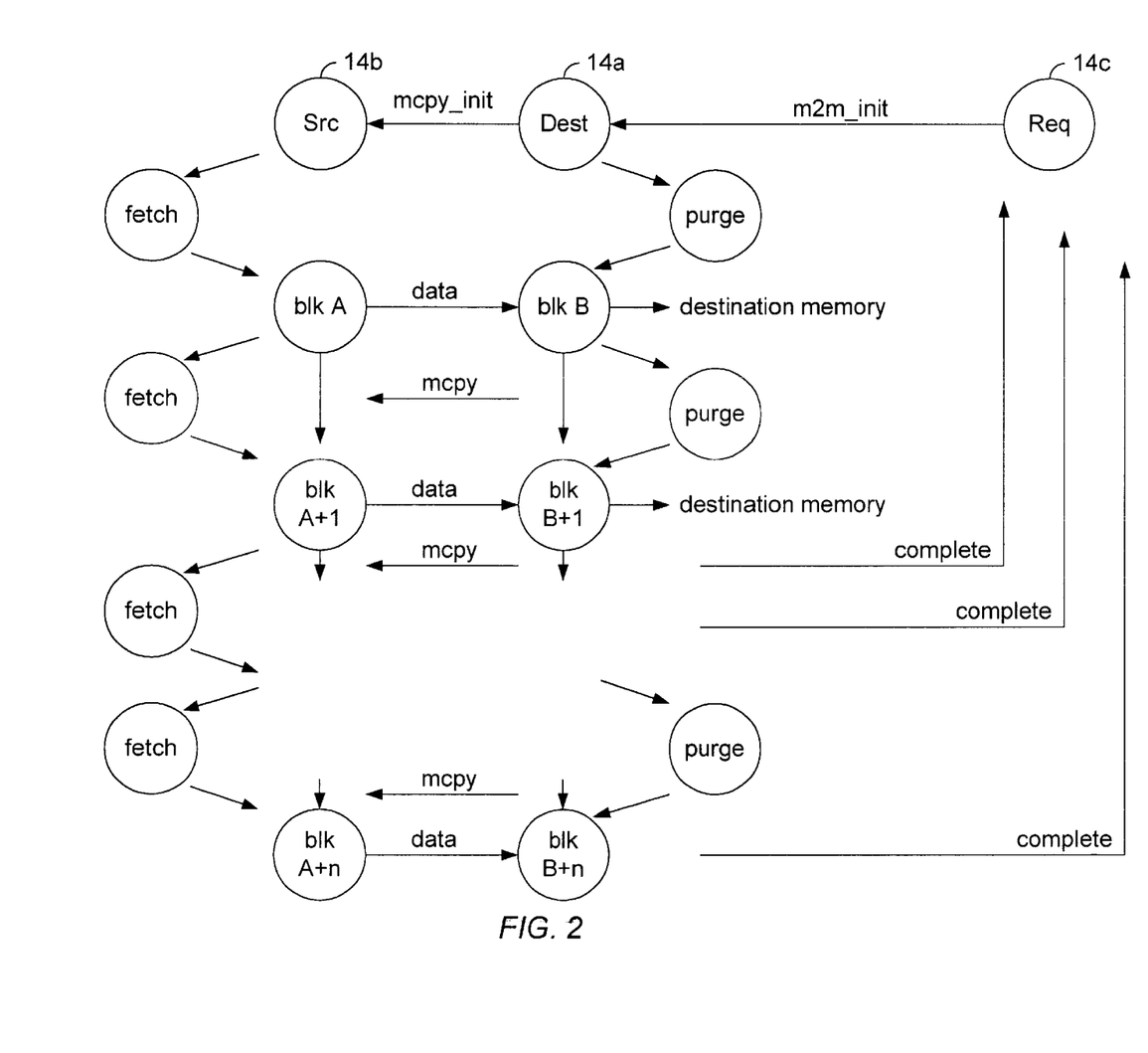
FIG. 2 is a block diagram illustrating the method of enhancing the memory-to-memory copy using system control units operating in a coherent mode.

After communication has been established, execution of the operation begins by sending a memory-to-memory initialization command from the requesting system control unit 14c to the destination system control unit 14a (see also FIG. 2). The memory-to-memory initialization command may include the source address, the destination address, the total number of data blocks or cache lines to be copied, and the source system control unit identification number which identifies the system control unit that is to receive the commands from the destination system control unit.

FIG. 2 is a block diagram illustrating the method of enhancing the memory-to-memory copy using system control units operating in a coherent mode. When the destination system control unit 14a receives a memory-to-memory initialization command, it designates a coherence thread to handle the request. The coherence thread at the destination system control unit controls the memory-to-memory copy by issuing requests, such as a memory copy initialization request, to the source system control unit 14b. Upon receiving the request, a corresponding coherence thread at the source system control unit is allocated to establish the connection. Hence, the two coherence threads, one at the destination and one at the source system control unit, communicate with each other during the initialization process.

Figure 3:
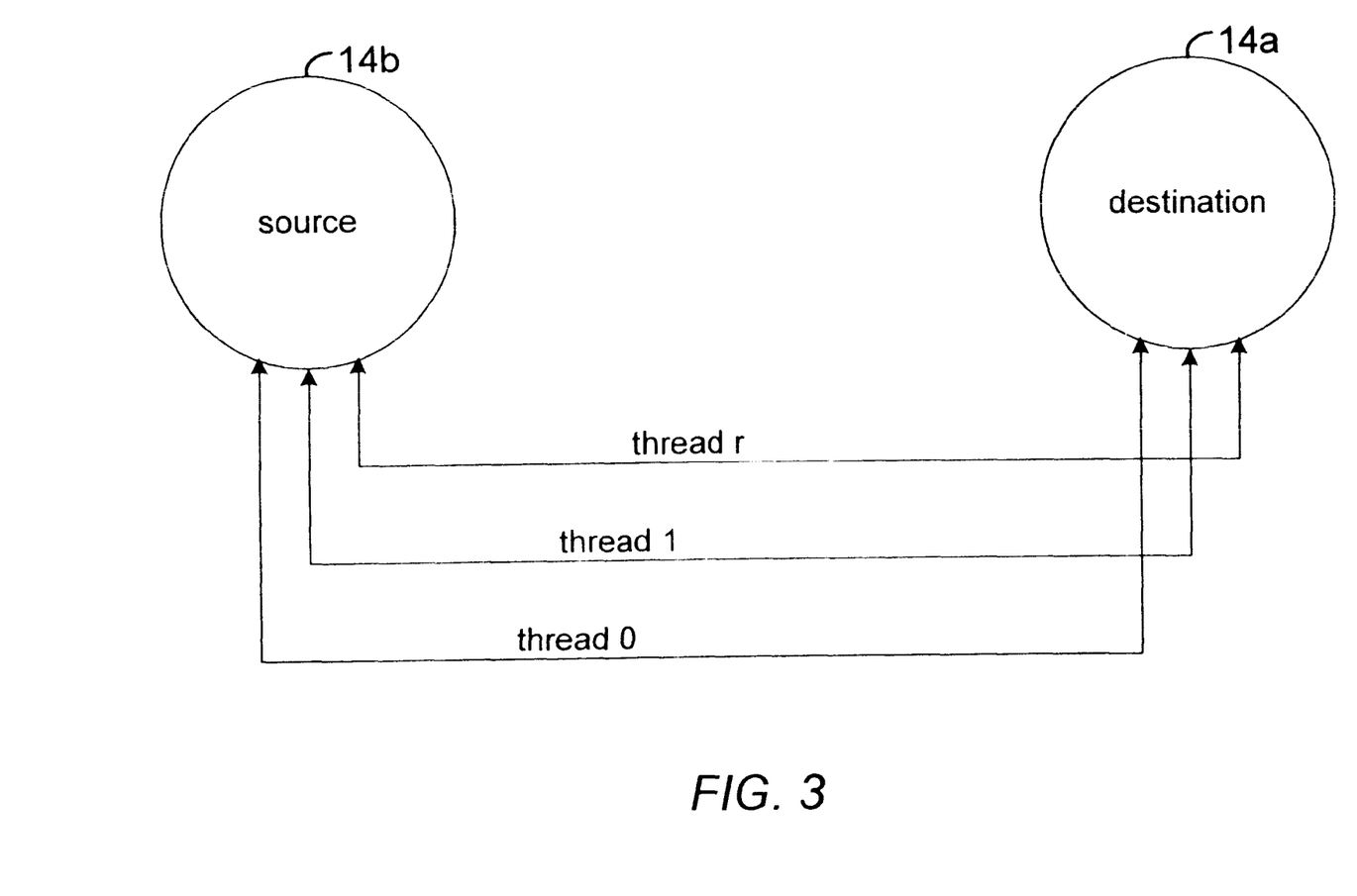
FIG. 3 is a block diagram illustrating the system control unit utilizing a number of threads to execute memory-to-memory copy operations in parallel.

FIG. 3 is a block diagram illustrating the system control units utilizing a number of threads r to execute memory-to-memory copy operations in parallel. Each thread provides a block transfer channel for the transfer of data blocks. For example, thread 0 may be used to transfer blocks 0 to 49 and thread 1 may be used to transfer blocks 50 to 99. One of ordinary skill in the art will be able to determine the number of threads r to utilize for a particular application.

Referring back to FIG. 2, the destination system control unit 14a purges the memory block beginning at the destination address and ending at the end of the memory block. The destination system control unit also sends a purge request to remote system control units whose processor's cache memory has a cached copy of the data which is identical to the data located at the destination address. The purge request instructs the remote system control units to purge the cached copy of the data located in the processor's cache memory.

Using the source address information contained in the memory copy initialization request, the source system control unit 14b retrieves the data block from its local memory and transfers the data to the destination system control unit 14a. Alternatively, the source system control unit retrieves the data block from a processor's cache memory, typically referred to as a recall operation. During a recall operation, the source system control unit sends a request to a remote system control unit to retrieve the data from the processor's cache. The remote system control unit sends a copy of the data to the source system control unit which stores the data in its local memory and sends a copy of the data to the destination system control unit.

After the data is transferred, the source system control unit 14b decrements the total number of blocks counter by one. The source system control unit continues to retrieve and send data blocks to the destination system control unit 14a until the total number of data blocks counter reaches zero. The destination system control unit 14a receives the data and stores the data in its local memory. The destination system control unit typically stores the data in the memory space that was purged. After the first block has been transferred, the destination system control unit may send a memory copy request to the source system control unit requesting another data block. The memory copy request includes a command that is similar to the memory copy initialization request. Once a predetermined number of block transfers have been completed, a complete block signal is sent from the destination system control unit to the requesting system control unit 14c. This process is repeated for each memory block as depicted in FIG. 2. The terms memory block or data block may be used interchangeably with the term cache line. In another embodiment, the requesting system control unit and the destination system control unit or the source system control unit are the same node. In another embodiment, the destination system control unit and the source control unit are the same node. In yet another embodiment, one system control unit, e.g., a combined source and destination system control unit, controls the source and the destination memory. The combined system control unit divides the m data block copies into r*p block transfer operations where r threads are allocated and p block copy operations are performed by each thread.

The memory copy initialization request and subsequent memory copy requests may be augmented with a "+1" semantic. This semantic instructs the source system control unit 14b to activate a thread to begin retrieving the next data block as soon as the current data block is transmitted or copied to the destination system control unit 14a. Hence, the destination system control unit 14a does not have to intermittently send a memory copy request to the source system control unit. Instead, the memory copy initialization request includes multiple data copy requests that are stored and processed by the source system control unit.

Figure 4:
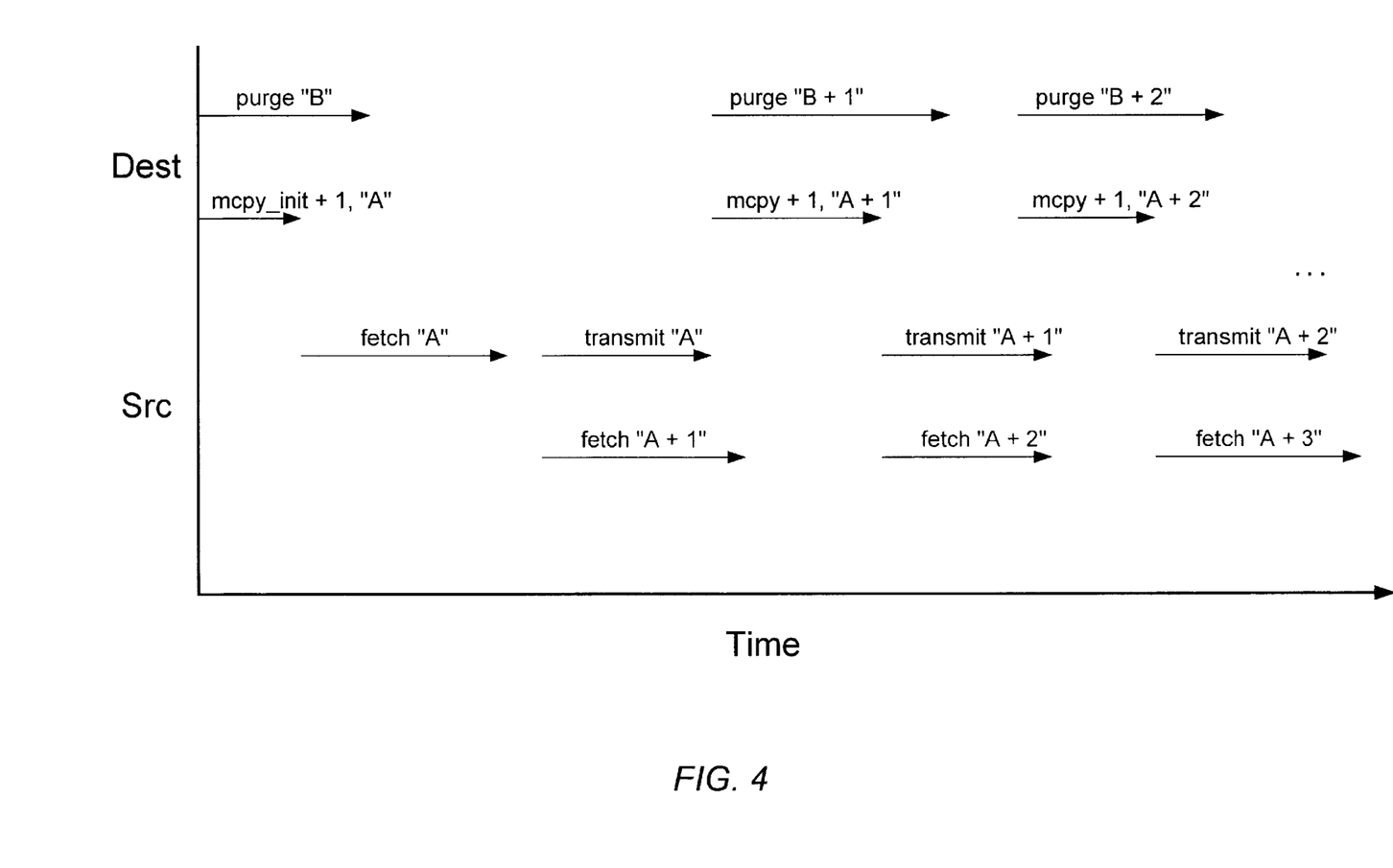
FIG. 4 is a timing diagram showing a sequence of consecutive block data transfers according to the method as illustrated in FIG. 2.

FIG. 4 is a timing diagram showing a sequence of consecutive block data transfers according to the method as illustrated in FIG. 2. Consecutive data blocks {A, A+1, A+2, ...} are retrieved or fetched from source memory and are transferred or copied to the destination memory {B, B+1, B+2, ... }, respectively. FIG. 4 illustrates that the long latency period that typically results in block copies may be reduced by overlapping the retrieving or fetching and transferring of blocks from the source system control unit 14b to the destination system control unit 14a.

In the coherent mode of operation, the destination system control unit 14a purges block B which is part of the memory block in the destination memory and sends a memory copy initialization "+1" request along with the source address of block A to the source system control unit 14b. The source system control unit retrieves the data in block A from the source memory and transmits the data in block A to the destination system control unit for storage in the B block. During the transfer, the source system control unit retrieves the data in block A+1 and the data in block B+1 is purged by the destination system control unit. The data in block A+1 is then transferred to the destination system control unit for storage in the B+1 block while the data in block A+2 is retrieved. The process continues for the remaining blocks as shown in FIG. 4.

The above process demonstrates the coordination between two coherent threads, one at the destination system control unit and one at the source system control unit. Since the system control units are multi-threaded, the computer system is typically implemented by using multiple threads for the block copy operations. Hence, each system control unit supports multiple coherent and non-coherent memory copy transactions. Using multiple threads, allow the system control unit to further enhance the speed of copying data. This allows the blocks to be processed in parallel as shown in FIGS. 3 and 4. "In parallel" means that the transaction are being performed simultaneously or the transactions overlap in time. For example, two transactions are performed in parallel if there is a moment in time that the execution of the transactions overlap. Parallel processing of multiple coherence memory copy transactions using multiple threads enhances the speed and efficiency of block copying.

Figure 5:
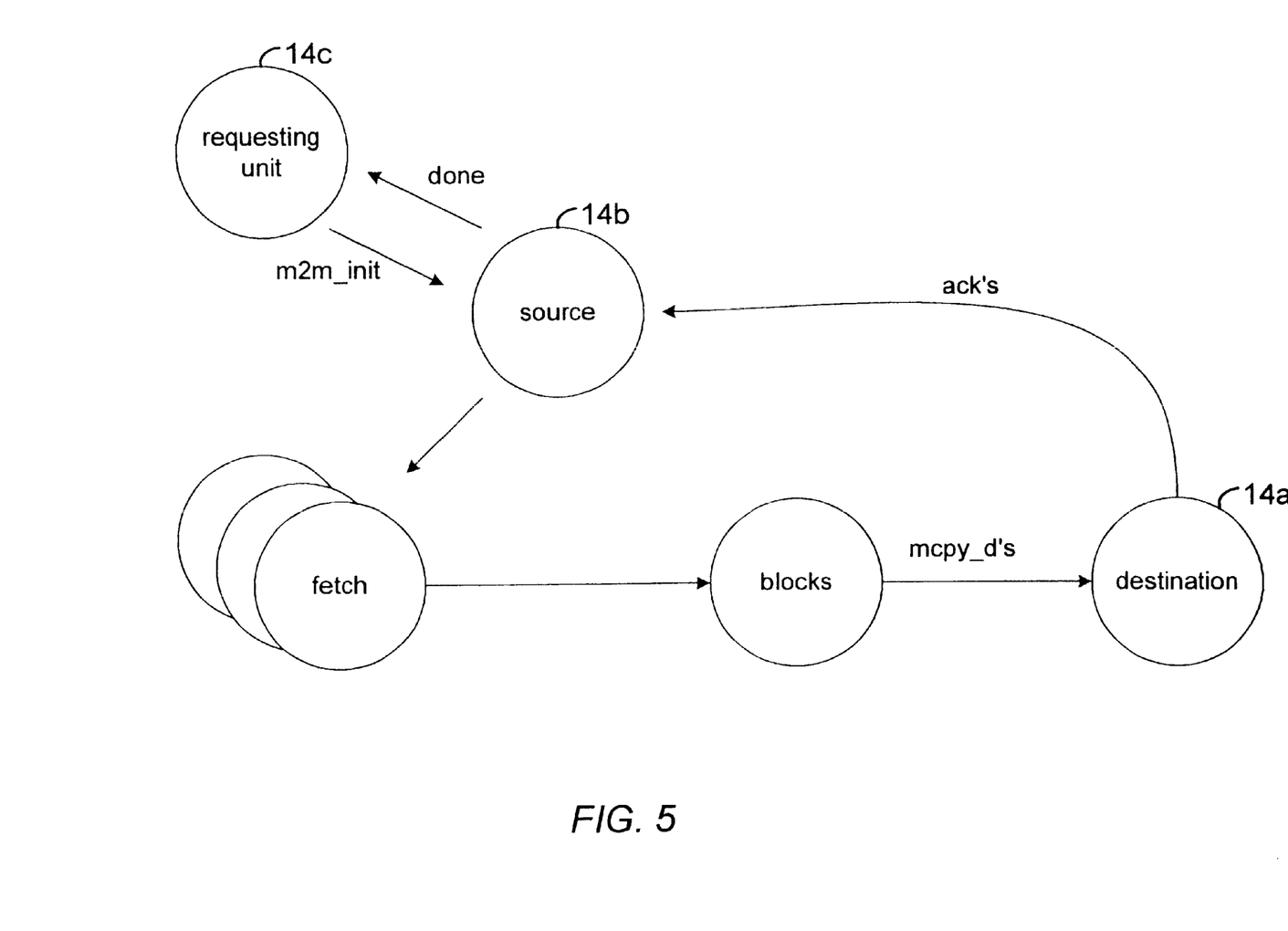
FIG. 5 is a block diagram illustrating the method of enhancing the memory-to-memory copy using system control units operating in a non-coherent mode.

FIG. 5 is a block diagram illustrating the method of enhancing the memory-to-memory copy using system control units operating in a non-coherent mode. In the non-coherent mode, the requesting system control unit 14c transmits the memory-to-memory copy initialization request to the source system control unit 14b. The source system control unit retrieves multiple data blocks from the source memory and sends these blocks of data to the destination system control unit 14a. The source system control unit counts the number of data blocks transferred. To ensure that all the data blocks were received, the destination system control unit sends an acknowledge signal to the source system control unit indicating the number of blocks it received. The source system control unit compares this number with the number of blocks it transferred to verify that the block copy was successful. If the block copy was unsuccessfully, the data block copy procedure is repeated. If the block copy was successful, the source system control unit sends a complete signal to the requesting system control unit.

Figure 6:
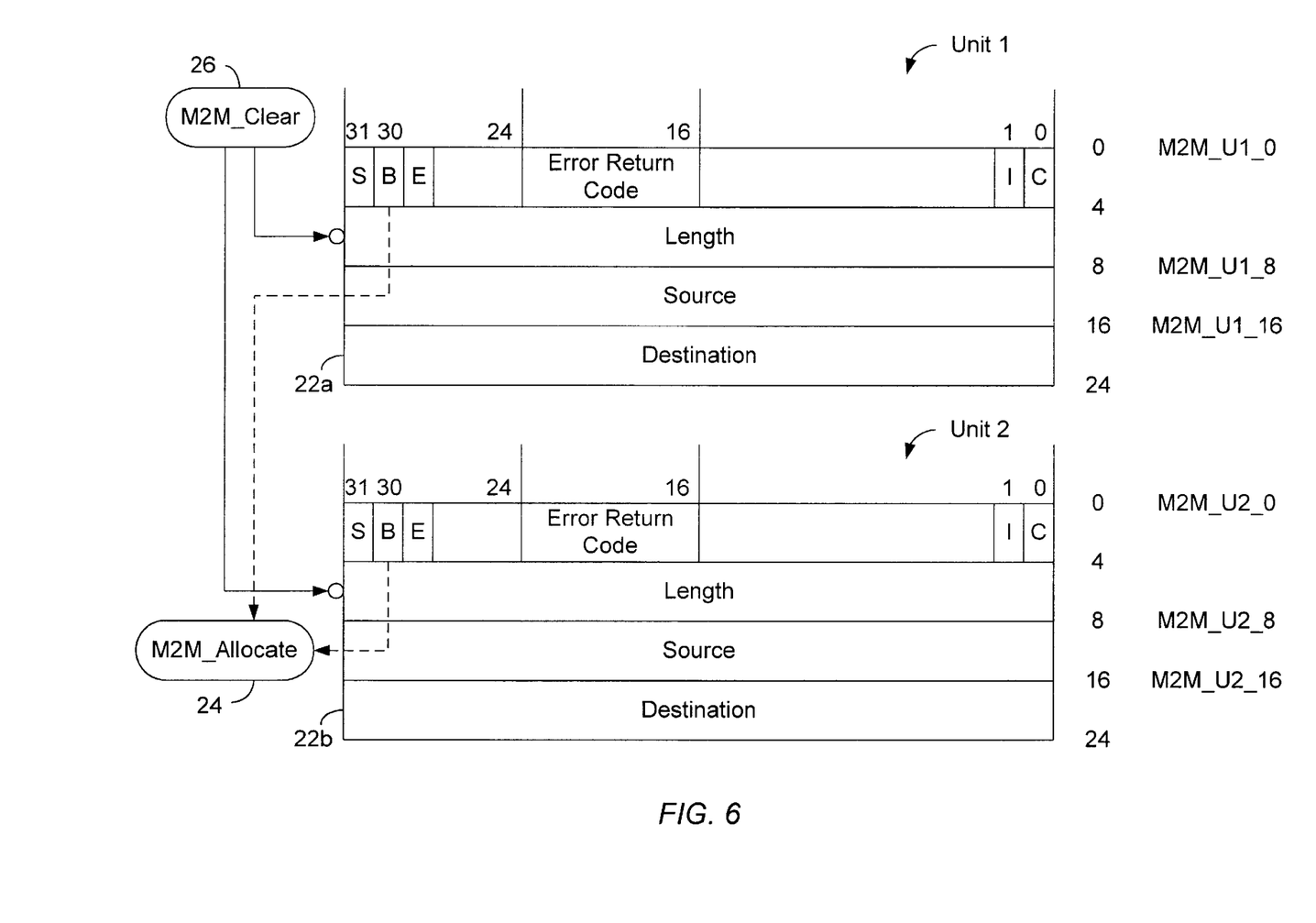
FIG. 6 is a block diagram illustrating a block transfer engine for keeping track of the progress of a designated memory-to-memory copy operation.

FIG. 6 is a block diagram of a block transfer engine (BTE) located in the system control units. The BTE includes two substantially identical units 22a, 22b, referred to as unit 1 and unit 2, along with a memory-to-memory allocation port 24. Unit 1 and unit 2 keep track of the progress of a designated memory-to-memory copy operation. Each unit has four 32-bit registers that are independently accessible. Each sequence of block transfers may be monitored by a separate BTE unit. Hence, hundreds of BTE units may be implement for a particular application.

The BTE also includes a number of bits, e.g., S, B, E, I, and C, that are used to track the progress of operations that are controlled by the system control units. The status bit S is typically the 32nd bit in each unit and is polled by the system control unit to determine whether the operation is in progress, e.g. the S bit is set to 0, or the operation has been completed, e.g., the S bit is set to 1. The B bit is typically the 31st bit in each unit and is set when the memory-to-memory allocation port is accessed. When the B bit is set to 0, the unit is available, and when the B bit is set to 1, the unit has been assigned to a particular thread or transaction. The error bit E indicated whether the operation has been successfully completed, e.g., the E bit is set to 0, or an error has occurred, e.g., the E bit is set to 1. If an error has occurred, the system control unit can examine the error return code for the specific description of the error. When the interrupt enable bit I is set to 0, the system control unit polls the S bit to determine when the operation is completed. On the other hand, if the I bit is set to 1, the system control unit will generate an interrupt indicating that the operation is complete. The I bit is the 1st bit in each unit. The data coherent bit C is set to 0 when the operation is non-coherent and set to 1 when the operation is coherent. The length register L stores the length of the block transfer in terms of the number of cache lines. The source register stores the starting address of the source data and the destination register stores the destination address of the destination data. Both these addresses are typically aligned on a cache line boundary.

To set up a block transfer operation, the system control unit reads the memory-to-memory allocation port 24 to determine whether either one of the units is available to process the request. If the read operation returns a zero value, neither unit is available. Otherwise, the system control unit determines which unit is available, selects the unit k that is available, and sets the B bit of the k-th unit to indicate that the unit is performing an operation. The system control unit then sets up the destination register, the source register, the length L register, the interrupt enable I bit, and the coherence C bit in this sequence by posting uncached writes to address M2M_Uk_16, M2M_Uk_8, and M2M_Uk_0 of unit k. The last write to M2M_Uk_0 will trigger the block transfer operation and cause the S bit to be set to 1. To provide the system control unit full control of the hardware, a M2M_Clear port 26 is provided and can reset the targeted unit by writing an ID to the M2M_Clear port.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. In a computer system comprising a processor, a requesting system control unit, a source system control unit, a destination system control unit, a source memory coupled to the source system control unit, and a destination memory coupled to the destination system control unit, a method of enhancing a memory-to-memory copy operation using system control units, the method comprising:

transmitting from the processor to the requesting system control unit a memory-to-memory copy transaction including a source address and a destination address;

performing a lookup operation on the source address to determine the source system control unit that controls access to the source memory which contains the source address;

performing a lookup operation on the destination address to determine the destination system control unit that control access to the destination memory which contains the destination address;

transmitting from the requesting system control unit to the destination system control unit the memory-to-memory copy transaction including the source address and the destination address;

transmitting from the destination system control unit to the source system control unit the memory-to-memory copy transaction including the source address and the destination address;

retrieving a data block located at the source address in the source memory;

transmitting the data block and the destination address to the destination system control unit; and storing the data block in a memory block located at the destination address in the destination memory.

2. The method of claim 1, further comprising establishing communication between the requesting system control unit and the destination system control unit.

3. The method of claim 1, further comprising designating a coherent thread in the source system control unit to process the memory-to-memory copy transaction.

4. The method of claim 1, further comprising purging the memory block located at the destination address in the destination memory.

5. The method of claim 1, further comprising transmitting from the destination system control unit to the requesting system control unit a complete signal after the data block has been stored in the memory block.

6. The method of claim 1, wherein the requesting system control unit and the destination system control unit is one module.

7. The method of claim 1, further comprising transmitting from the destination system control unit to the source system control unit, after the data block is received by the destination system control unit, a second memory-to-memory copy transaction including a second source address and a second destination address.

8. The method of claim 1, wherein the memory-to-memory copy transaction further includes a number of cache lines to be copied.

9. In a computer system comprising a processor, a cache coupled to the processor, a source system control unit coupled to the cache, a destination system control unit coupled to the source system control unit, a source memory coupled to the source system control unit, an a destination memory coupled to the destination system control unit, a method of enhancing a memory-to-memory copy operation using system control units, the method comprising;

transmitting from the processor to the source system control unit a plurality of memory-to-memory copy transactions, each transaction including a source address and a destination address;

performing a lookup operation on the destination address to determine the destination system control unit that controls access to the destination memory which contains the plurality of destination addresses;

retrieving a plurality of data blocks;

transmitting the plurality of data blocks and the plurality of destination addressees to the destination system control unit; and storing the plurality of data blocks at the plurality of destination addresses in the destination memory.

10. The method of claim 9, further comprising purging the data located in the plurality of destination addresses before storing the plurality of data blocks at the plurality of destination addresses in the destination memory.

11. The method of claim 9, further comprising purging a cached copy of the data in the cache which is identical to the data located at the destination address.

12. The method of claim 9, wherein the source system control unit counts the plurality of data blocks transmitted to the destination system control unit.

13. The method of claim 12, further comprising transmitting from the destination system control unit to the source system control unit a count of the number of blocks received by the destination system control unit.

14. The method of claim 9, wherein the plurality of data blocks are located at the plurality of source addresses in the source memory.

15. The method of claim 9, wherein retrieving the plurality of data blocks includes sending a request to a remote system control unit to access the data from its processor's cache.

16. The method of claim 9, wherein retrieving the plurality of data blocks and transmitting the plurality of data blocks and the plurality of destination addresses to the destination system control unit is performed in parallel.

* * * * *